(12) United States Patent
Sinha et al.

(10) Patent No.: US 6,983,286 B1
(45) Date of Patent: Jan. 3, 2006

(54) METHOD AND APPARATUS FOR ACCESSING DATA AS IT EXISTED AT A PREVIOUS POINT IN TIME

(75) Inventors: Bipul Sinha, Foster City, CA (US); Namit Jain, Foster City, CA (US); Amit Ganesh, San Jose, CA (US); Archna Kalra Johnson, Sunnyvale, CA (US); Srinivas Vemuri, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 418 days.

(21) Appl. No.: 10/325,211

(22) Filed: Dec. 18, 2002

Related U.S. Application Data

(60) Provisional application No. 60/378,016, filed on May 10, 2002.

(51) Int. Cl.
*G06F 17/30* (2006.01)
(52) U.S. Cl. .................................. 707/102
(58) Field of Classification Search ............. 707/1–10, 707/100–205; 709/203; 714/7; 711/161; 718/101
See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 5,347,653 A | 9/1994 | Flynn et al. | |
| 5,440,730 A | 8/1995 | Elmasri et al. | |
| 5,638,508 A | 6/1997 | Kanai et al. | |
| 5,701,480 A * | 12/1997 | Raz ........................... | 718/101 |
| 5,857,204 A | 1/1999 | Lordi et al. | |
| 5,873,102 A | 2/1999 | Bridge, Jr. et al. | |
| 5,890,167 A | 3/1999 | Bridge, Jr. et al. | |
| 5,907,848 A | 5/1999 | Zaiken et al. | |
| 5,930,794 A | 7/1999 | Linenbach et al. | |
| 5,956,731 A | 9/1999 | Bamford et al. | |
| 5,974,427 A | 10/1999 | Reiter | |
| 6,012,059 A | 1/2000 | Neimat et al. | |
| 6,012,060 A | 1/2000 | Loaiza et al. | |
| 6,014,674 A | 1/2000 | McCargar | |

(Continued)

FOREIGN PATENT DOCUMENTS

FR      2 746 526 A1      9/1997

OTHER PUBLICATIONS

Nassima Djafri et al., Spatio-temporal evolution: querying patterns of change in databases, 2002, ACM Press, pp. 35-41.*

(Continued)

*Primary Examiner*—Diane Mizrahi
(74) *Attorney, Agent, or Firm*—Hickman Palermo Truong & Becker LLP

(57) ABSTRACT

Techniques are provided for sharing of flashback cursors by adding a time domain property to flashback cursors. This time domain property defines the range of flashback times for which the flashback cursor is valid. According to one embodiment, this "validity range" is closed at the lower bound and open at the upper bound. A subsequent flashback query can share an existing flashback cursor if the flashback time of the subsequent flashback query falls within the validity range of the existing flashback cursor. In one embodiment, the validity range of a flashback cursor is established based on times associated with indexes used to process the flashback query for which the flashback cursor was made. Consequently, an existing flashback cursor is less likely to be used by a subsequent flashback query when it would be inefficient to do so.

26 Claims, 4 Drawing Sheets

U.S. PATENT DOCUMENTS

| | | | |
|---|---|---|---|
| 6,018,746 A | 1/2000 | Hill et al. | |
| 6,029,160 A | 2/2000 | Cabrera et al. | |
| 6,067,550 A | 5/2000 | Lomet | |
| 6,138,121 A | 10/2000 | Costa et al. | |
| 6,173,292 B1 | 1/2001 | Barber et al. | |
| 6,182,241 B1 | 1/2001 | Ngai et al. | |
| 6,192,377 B1 | 2/2001 | Ganesh et al. | |
| 6,192,378 B1 | 2/2001 | Abrams et al. | |
| 6,237,001 B1 | 5/2001 | Bamford et al. | |
| 6,243,702 B1 | 6/2001 | Bamford et al. | |
| 6,263,338 B1 | 7/2001 | Ronström et al. | |
| 6,321,234 B1 | 11/2001 | Debrunner et al. | |
| 6,449,624 B1 | 9/2002 | Hammack et al. | |
| 6,480,847 B1 | 11/2002 | Linenbach et al. | |
| 6,502,133 B1 | 12/2002 | Baulier et al. | |
| 6,505,228 B1 | 1/2003 | Schoening et al. | |
| 6,567,928 B1 | 5/2003 | Lyle et al. | |
| 6,609,123 B1 | 8/2003 | Cazemier et al. | |
| 6,618,822 B1 | 9/2003 | Loaiza et al. | |
| 6,631,374 B1 | 10/2003 | Klein et al. | |
| 6,636,851 B1 | 10/2003 | Bamford et al. | |
| 6,647,473 B1 * | 11/2003 | Golds et al. | 711/161 |
| 6,647,510 B1 | 11/2003 | Ganesh et al. | |
| 6,681,230 B1 | 1/2004 | Blott et al. | |
| 6,735,605 B2 | 5/2004 | Bird et al. | |
| 6,738,975 B1 | 5/2004 | Yee et al. | |
| 6,769,074 B2 | 7/2004 | Vaitzblit | |
| 6,769,124 B1 | 7/2004 | Schoening et al. | |
| 2002/0116457 A1 * | 8/2002 | Eshleman et al. | 709/203 |
| 2005/0055385 A1 * | 3/2005 | Sinha et al. | 707/203 |
| 2005/0055603 A1 * | 3/2005 | Soran et al. | 714/7 |

OTHER PUBLICATIONS

Sirish Chandrasekaran et al., "PSoup: a system for streaming queries over streaming data", 2003, vol. 12, Issue 2, pp. 140-156.*

Sandra Cheevers, Oracle Corporation, "Oracle9i Database Summary," An Oracle White Paper, May 2002, pp. 1-35.

Ron Weiss, Oracle Corporation, "Oracle 9i Availability and Manageability Technology," Feb. 13, 2001, pp. 1-39.

Ron Weiss, Oracle Corporation, "Oracle High Availability Architectural Overview," Feb. 12, 2001, pp. 1-37.

Oracle Corporation, "Oracle9i Flashback Query," Oracle 9i Database, Daily Feature, Apr. 18, 2002, pp. 1-2.

Oracle Corporation, "Flashback Technology," 2004, pp. 1-5.

Chiang Lee et al, "Temporal Grid File: A File Structure for Interval Data," Data & Knowledge Engineering, vol. 26, No. 1, May 1998, XP-001004414, pp. 71-97.

Toshiyuki Amagasa et al, "Implementing Time-Interval Class for Managing Temporal Data," International Workshop on Database and Expert Systems Applications, Aug. 26, 2003, XP-002167975, 7 pages.

* cited by examiner

METHOD AND APPARATUS FOR ACCESSING DATA AS IT EXISTED AT A PREVIOUS POINT IN TIME

CROSS-REFERENCE TO RELATED APPLICATIONS

The present application claims priority to Provisional Patent Application Ser. No. 60/378,016, filed May 10, 2002, the disclosure of which is hereby incorporated by reference herein in its entirety.

TECHNICAL FIELD

The systems and methods described herein relate to data access systems and, more particularly, to systems and methods that access data from a database.

BACKGROUND

A database management system (DBMS) is a layer of software between a physical database (i.e., the files storing the data in the database) and the user. The DBMS manages requests for database action (such as queries or updates) from a user. Additionally, the DBMS permits centralized control of security and data integrity requirements.

In some situations, it is desirable to retrieve data in the state in which the data existed at a specific previous point in time. FIG. 1 is a flow diagram illustrating an existing procedure 100 for accessing "past data" from a database or other data storage mechanism. Initially, the procedure identifies a previous time that the data values should reflect (block 102). A flashback command is executed that changes the system time to the previous time (block 104). The procedure then executes one or more commands to retrieve data values associated with the previous time (block 106). Finally, the procedure executes a flashback disable command that changes the system time back to the current time (block 108).

The above procedure is effective at retrieving data values associated with a previous time. However, if the procedure is in the flashback mode (i.e., a flashback command has changed the system time to the previous time), then the procedure must exit (or disable) the flashback mode before retrieving data values associated with the current time or associated with a different previous time. This switching into and out of the flashback mode is time-consuming and may result in the repeated compilation of similar database queries.

Various database languages, such as SQL (Structured Query Language), support special-purpose constructs referred to herein as "cursors". Prior to retrieving the results of a specific query statement, the DBMS may perform a significant amount of preliminary work for the statement, such as parsing, semantic analysis, and query plan generation. A cursor stores the results of much of this preliminary work. Consequently, when a query statement arrives, the DBMS first attempts to match the statement to statements for which cursors have already been created. If a match is found, the cursor is shared by the query statements, and the overhead work is avoided.

A "flashback cursor" is a particular type of cursor that is used to access past data. A flashback cursor is created in response to receipt of a "flashback query". Unlike conventional queries, flashback queries specify a flashback time, and return data as it existed at the specified flashback time. One technique for handling flashback queries is described in patent application Ser. No. 09/676,305, filed Sep. 29, 2000, entitled SYSTEM AND METHOD FOR PROVIDING FINE-GRAINED TEMPORAL DATABASE ACCESS, by JONATHAN D. KLEIN, et al, the contents of which are incorporated herein by this reference.

Because flashback queries return data as of a particular flashback time, the flashback time must be taken into account during the preliminary work performed on the flashback query. For example, the execution plan of a flashback query should not attempt to use access structures, such as indexes, that did not exist at the flashback time of the query for which they are being made. Because the preliminary work is based on the specific flashback time, flashback cursors generally cannot be used by flashback queries other than the one for which they are created. The inability to share flashback cursors can result in significant inefficiencies.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION

The systems and methods described herein are related to sharing data structures used to access data associated with a specific point in time. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Exemplary Data Storage System

Figure 1:
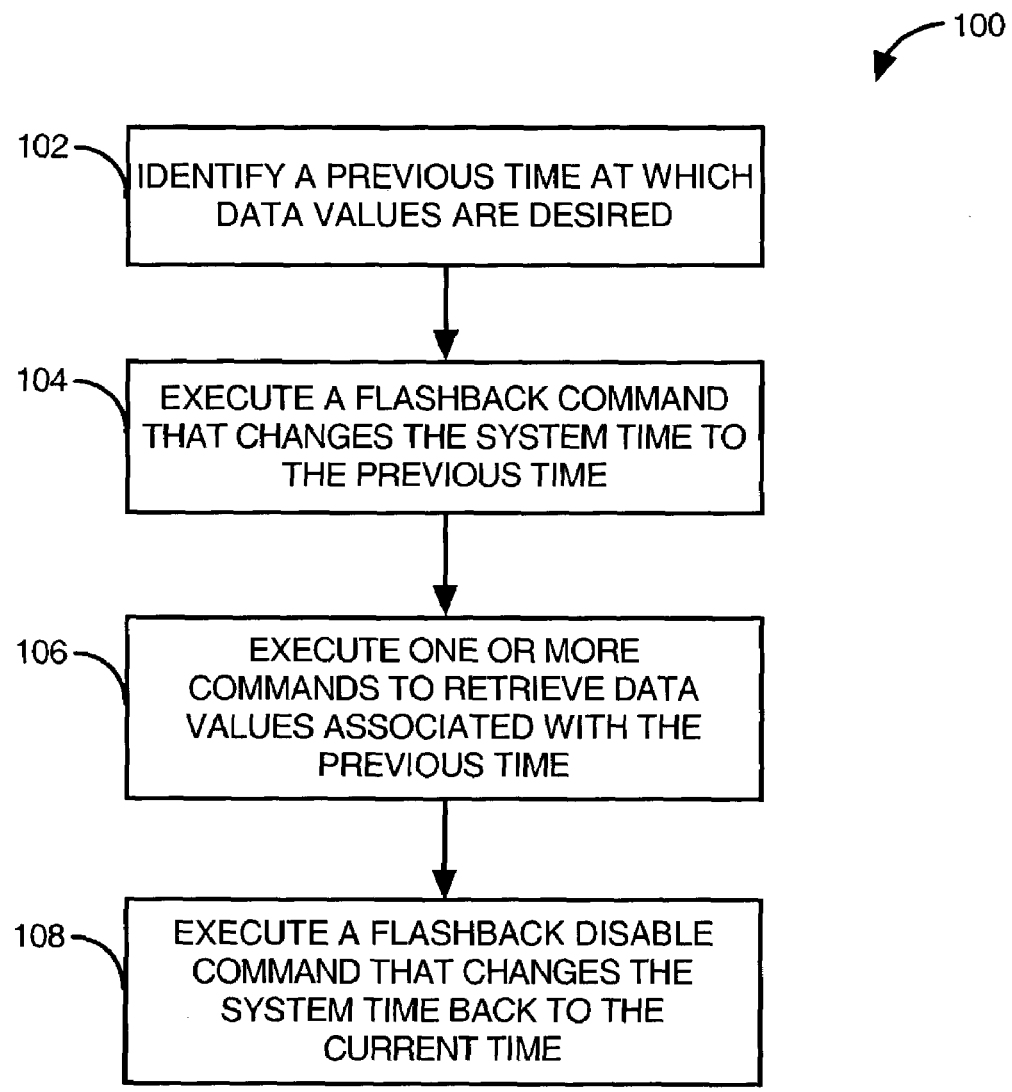
FIG. 1 is a flow diagram illustrating an existing procedure for accessing past data from a database or other data storage mechanism.
Figure 2:
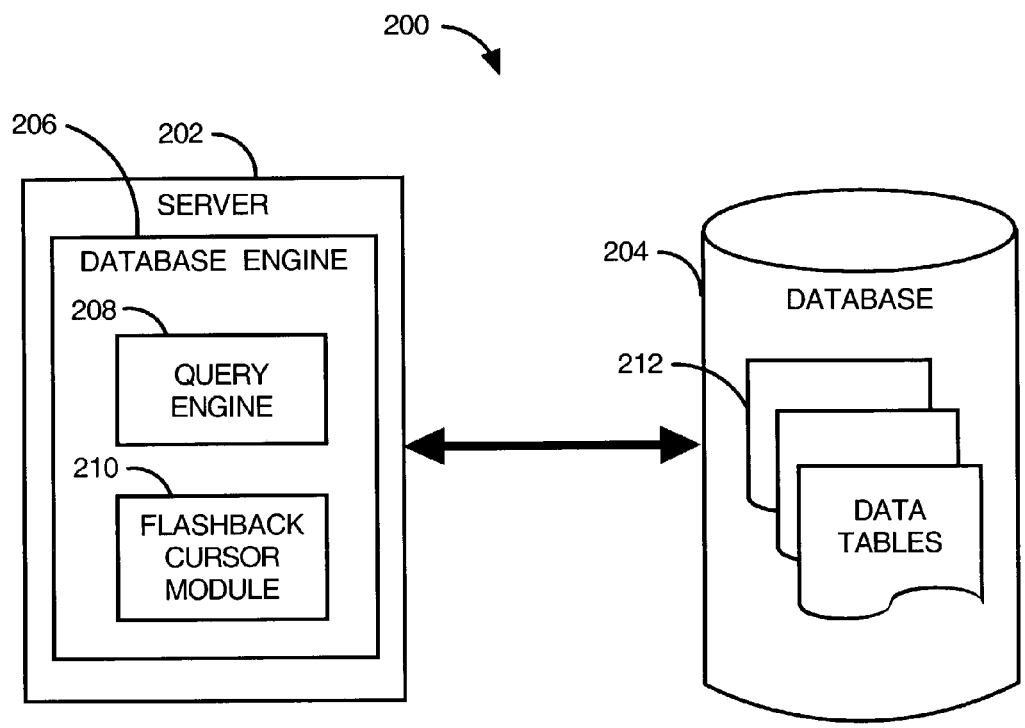
FIG. 2 is a block diagram illustrating a data storage and data access system.

FIG. 2 is a block diagram illustrating a data storage and data access system 200. System 200 includes a server 202 coupled to a database 204. The server 202 contains a database engine 206 that performs various data save operations and data retrieval operations. The database engine 206 includes a query engine 208 and a flashback cursor module 210. Query engine 208 provides the basic functionality for interrogating the database 204 and retrieving data items from data tables 212 stored therein. In a particular embodiment, query engine 208 interprets statements written in SQL, although other query languages may also be used.

The flashback cursor module 210 allows database engine 206 to access data values stored in database 204 in the state in which such values existed at a previous point in time. As used herein, a "point in time" may refer to a particular moment in time (e.g., 5:15 p.m.). A previous point in time may be identified, for example, by a standardized time (e.g., 5:20 p.m.), a time relative to the standardized time (e.g., 15 minutes ago), or by a system change number, discussed below.

Sharing Flashback Cursors

A statement may share an existing cursor if the text of the SQL query statement matches the statement for which the cursor was built and some other conditions are satisfied. The cursor is shared if and only if the compiled result of the query would be exactly the same as the one already present in memory. Cursor sharing results in highly efficient query processing due to the time and resources saved in statement parsing, semantic analysis, and query plan generation. As mentioned above, flashback cursors are special cursors for accessing past data. These cursors are built with dictionary data as of the system time when the query was issued. The query plan is generated by taking into account the creation time of the access structures like indices and the specified point in time in the past for the flashback query.

According to one embodiment, the sharing of flashback cursors is facilitated by adding a time domain property to flashback cursors. This time domain property defines the range of flashback times for which the flashback cursor is valid. According to one embodiment, this "validity range" is closed at the lower bound and open at the upper bound. A flashback query can share an existing flashback cursor if the flashback time of the query falls within the validity range of the existing flashback cursor.

According to one embodiment, the flashback cursor time domain is defined as (low_time, hi_time). Any subsequent flashback query with a specified point in time (t) in the past can share an existing flashback cursor if $t \geq$ low_time and $t \leq$ hi_time. These times are initialized at the beginning of the parse phase of the flashback query. The following example code illustrates one possible implementation of a flashback cursor.

hi_time=current system time low_time=t_flashback (specified point in time for the flashback query)

The hi_time is adjusted, if necessary, at the query optimization time as follows:

```
for(every_index_used_for_this_query)
{
    if(index_specification_time ≥ t_flashback)
    {
        ignore_this_index;
        /* hi_time adjustment */
        if(first_index_being_ignored)
        {
            copy_the_index_specification_time_into_the_hi_time;
        }
        else if (hi_time > index_specification_time)
        {
            copy_the_index_specification_time_into_the_hi_time;
        }
    }
}
```

After the adjustments, the resulting time domain of the flashback cursor defines an interval for which cursor sharing does not lose any efficiency in terms of access methods. Using appropriate access structures is very important for a query. For example, the access structures chosen to process a query can drastically change the time needed to process the query. Choosing the appropriate access structures is even more important when processing a flashback query, since every data block encountered during use of the access structures is reconstructed as of the flashback query time.

In a particular embodiment, flashback queries contain a time parameter (also referred to as a "time identifier"). The time parameter associated with a command specifies the point in time with which the command is to operate. For example, the command SELECT Foo from Bar ASOF time_identifier selects data (Foo) from a data source (Bar) at a particular point in time (time_identifier). The time identifier can be a timestamp, a system change number (SCN), or other parameter that identifies a particular point in time.

The DBMS receives the command and determines the point in time associated with command. The DBMS then determines whether any existing flashback cursor is associated with (1) a query that matches the received command, and (2) a time range that includes the time value of the received command. According to one embodiment, if an existing flashback cursor satisfies these two conditions, then the flashback cursor is "shared" by the received command. Otherwise, a new flashback cursor is created for the received command.

Processing Data

Figure 3:
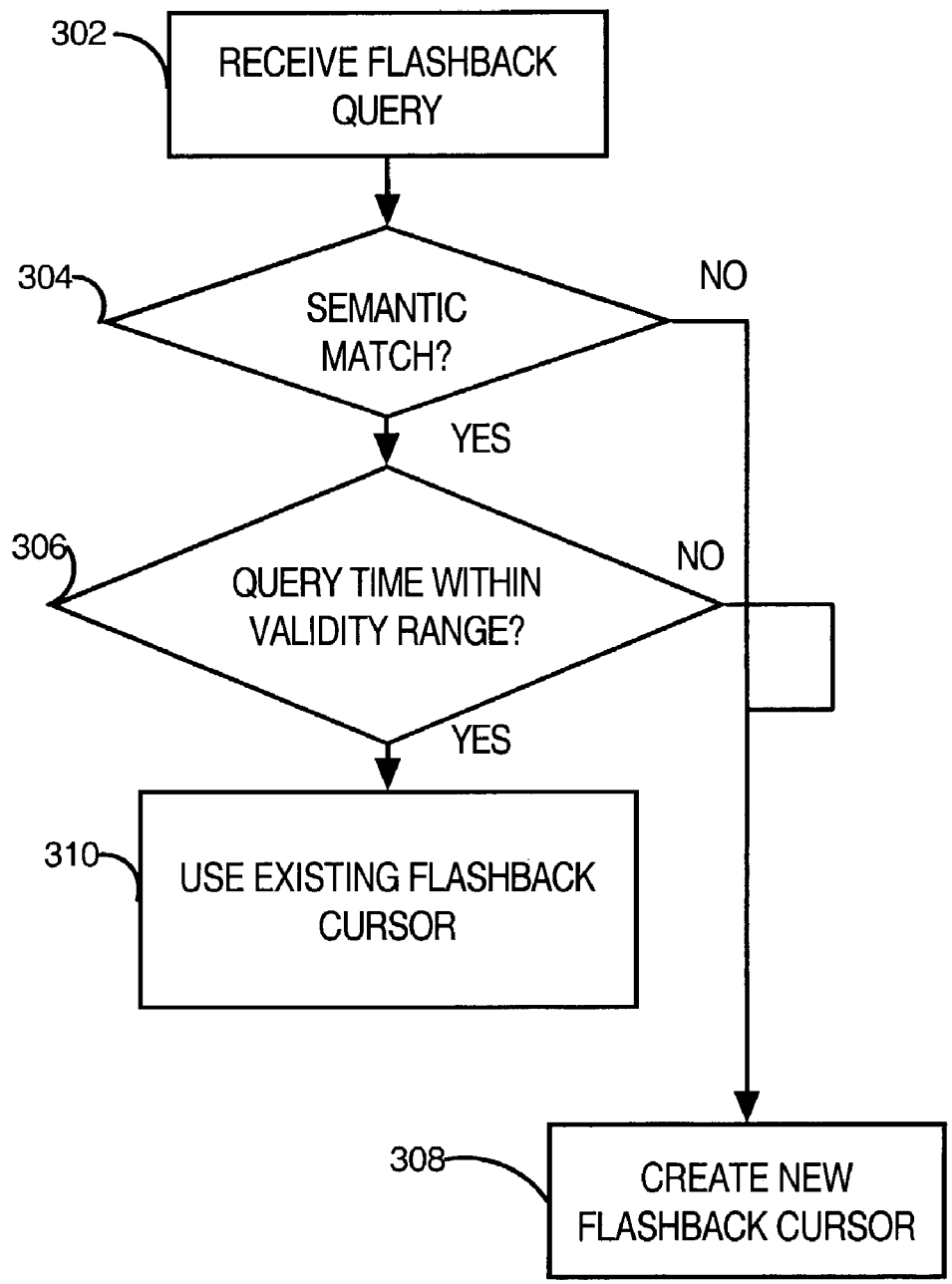
FIG. 3 is a flow diagram illustrating a procedure for the time-based sharing of flashback cursors to access data associated with different points in time.

FIG. 3 is a flow diagram illustrating a technique for the time-based sharing of flashback cursors to access data, where the flashback queries that are sharing the flashback cursor may be associated with different points in time. The technique illustrated in FIG. 3 may be executed, for example, by database engine 206 discussed above with respect to FIG. 2.

Referring to FIG. 3, at step 302 a flashback query is received by a database server. At step 304, the database server determines whether the flashback query semantically matches a previously-received flashback query for which a flashback cursor has been created. If the flashback query semantically matches a previously-received flashback query for which a flashback cursor has been created, then control proceeds to step 306. Otherwise, control proceeds to step 308. At step 306, the database server determines whether the point in time associated with the flashback query falls within the validity range of the flashback cursor. If the point in time associated with the flashback query falls within the validity range of the flashback cursor, then control proceeds to step 310 where the existing flashback cursor is used to process the flashback query. Otherwise, control proceeds to step 308.

At step 308, a new flashback cursor is created for the flashback query. During the creation process, a validity range is assigned to the flashback cursor. The validity range assigned to the flashback cursor may then be used to determine whether subsequent flashback queries can share the new flashback cursor.

In the technique illustrated in FIG. 3, an existing flashback cursor is shared by an incoming flashback query if the flashback query satisfies two conditions: (1) the flashback query semantically matches the query associated with the flashback cursor, and (2) the point in time associated with the flashback query falls within the validity range associated with the flashback cursor. However, in alternative embodiments, these conditions may be merely two of a set of many conditions that are actually taken into account when determining whether a flashback query can or should share an existing flashback cursor. Consequently, the present invention is not limited to any particular set of conditions.

The technique illustrated in FIG. 3 does not require a "flashback mode" to be activated and deactivated for each previous time at which data values are desired. Instead, commands to retrieve data from different previous times can be intermixed with one another. This ability is supported through the use of data retrieval commands that specify a desired time (or point in time) at which data values are to be retrieved.

Hardware Overview

Figure 4:
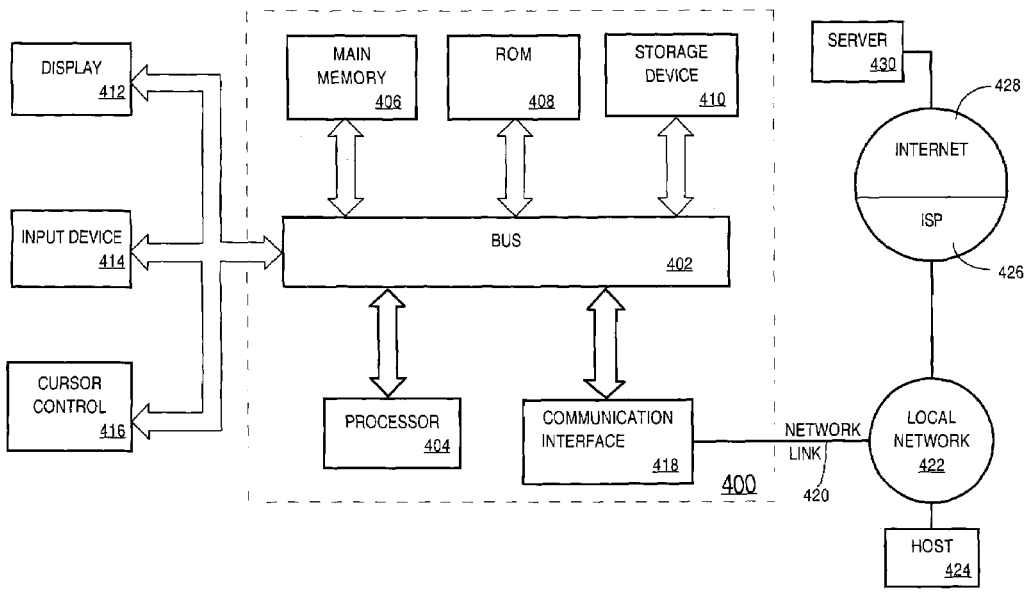
FIG. 4 is a block diagram that illustrates a computer system upon which the procedures discussed herein may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing flashback queries, the method comprising the steps of:
   receiving a flashback query;
   determining a flashback time associated with said flashback query;
   determining whether the flashback query satisfies a set of conditions relative to a flashback cursor that was created prior to receipt of said flashback query;
   wherein one condition in said set of conditions is that the flashback time associated with the flashback query satisfies a condition relative to a time period associated with the flashback cursor; and
   if the flashback query satisfies said set of conditions relative to said flashback cursor, then using the flashback cursor to process said flashback query.

2. The method of claim 1 wherein:
   a time range is associated with said flashback cursor; and
   the flashback time associated with the flashback query satisfies said condition relative to the time period associated with the flashback cursor if the flashback time associated with the flashback query falls within said time range.

3. The method of claim 2 wherein:
   the flashback query is a first flashback query;
   the flashback query satisfies said set of conditions relative to said flashback cursor;
   in response to determining that said first flashback query satisfies said set of conditions relative to said flashback cursor, the flashback cursor is used to process said first flashback query;
   the method further comprises the steps of:
      receiving a second flashback query;
      determining a second flashback time associated with said second flashback query, wherein said second flashback time is different from the flashback time associated with the first flashback query;
      in response to determining that said second flashback query satisfies said set of conditions relative to said flashback cursor, using the flashback cursor to process said flashback query.

4. The method of claim 1 wherein:
   the flashback query is a first flashback query;
   the flashback query satisfies said set of conditions relative to said flashback cursor;
   in response to determining that said first flashback query satisfies said set of conditions relative to said flashback cursor, the flashback cursor is used to process said first flashback query;
   the method further comprises the steps of:
      receiving a second flashback query;
      determining a second flashback time associated with said second flashback query;
      in response to determining that said second flashback query satisfies said set of conditions relative to said flashback cursor, using the flashback cursor to process said flashback query;
   wherein there is at least some period of time during which said flashback cursor is concurrently used to process both said first flashback query and said second flashback query.

5. The method of claim 1 further comprising the step of constructing said flashback cursor in response to a particular flashback query that was received prior to said flashback query.

6. The method of claim 5 wherein the step of constructing said flashback cursor includes determining said time period associated with said flashback cursor.

7. The method of claim 6 wherein the step of determining said time period associated with said flashback cursor includes determining a time range associated with said flashback cursor based on a point in time associated with said particular flashback query and times associated with indexes used to process said particular flashback query.

8. The method of claim 1 wherein:
   said time range includes a high value and a low value;
   said low value is established based on the point in time associated with said particular flashback query; and
   said high value is established based on a lowest time associated with any index used to process said particular flashback query.

9. A computer-implemented method for generating a flashback cursor, the method comprising the steps of:
   receiving a particular flashback query;
   generating said flashback cursor to use to process said particular flashback query;
   determining a time range based on a point in time associated with said particular flashback query and times associated with indexes that are to be used to process said particular flashback query; and
   associating said time range with said flashback cursor.

10. The method of claim 9 wherein:
    said time range includes a high value and a low value;
    said low value is established based on the point in time associated with said particular flashback query; and
    said high value is established based on a lowest time associated with any index used to process said particular flashback query.

11. The method of claim 9 further comprising the step of allowing flashback queries received subsequent to creation of said flashback cursor to share said flashback cursor when said subsequent flashback queries satisfy a set of conditions relative to said flashback cursor.

12. The method of claim 11 wherein the set of conditions includes a condition that flashback times associated with said subsequent flashback queries fall within the time range associated with said flashback cursor.

13. The method of claim 12 wherein at least two of said subsequent flashback queries concurrently use said flashback cursor.

14. A computer-readable medium carrying instructions for processing flashback queries, the instructions including instructions which, when executed by one or more processors, cause the one or more processors to perform the steps of:

receiving a flashback query;

determining a flashback time associated with said flashback query;

determining whether the flashback query satisfies a set of conditions relative to a flashback cursor that was created prior to receipt of said flashback query;

wherein one condition in said set of conditions is that the flashback time associated with the flashback query satisfies a condition relative to a time period associated with the flashback cursor; and if the flashback query satisfies said set of conditions relative to said flashback cursor, then using the flashback cursor to process said flashback query.

15. The computer-readable medium of claim 14 wherein:

a time range is associated with said flashback cursor; and the flashback time associated with the flashback query satisfies said condition relative to the time period associated with the flashback cursor if the flashback time associated with the flashback query falls within said time range.

16. The computer-readable medium of claim 15 wherein:

the flashback query is a first flashback query;

the flashback query satisfies said set of conditions relative to said flashback cursor;

in response to determining that said first flashback query satisfies said set of conditions relative to said flashback cursor, the flashback cursor is used to process said first flashback query;

the computer-readable medium further comprises instructions for performing the steps of:

receiving a second flashback query;

determining a second flashback time associated with said second flashback query, wherein said second flashback time is different from the flashback time associated with the first flashback query;

in response to determining that said second flashback query satisfies said set of conditions relative to said flashback cursor, using the flashback cursor to process said flashback query.

17. The computer-readable medium of claim 14 wherein:

the flashback query is a first flashback query;

the flashback query satisfies said set of conditions relative to said flashback cursor;

in response to determining that said first flashback query satisfies said set of conditions relative to said flashback cursor, the flashback cursor is used to process said first flashback query;

the computer-readable medium further comprises instructions for performing the steps of:

receiving a second flashback query;

determining a second flashback time associated with said second flashback query;

in response to determining that said second flashback query satisfies said set of conditions relative to said flashback cursor, using the flashback cursor to process said flashback query;

wherein there is at least some period of time during which said flashback cursor is concurrently used to process both said first flashback query and said second flashback query.

18. The computer-readable medium of claim 14 further comprising instructions for performing the step of constructing said flashback cursor in response to a particular flashback query that was received prior to said flashback query.

19. The computer-readable medium of claim 18 wherein the step of constructing said flashback cursor includes determining said time period associated with said flashback cursor.

20. The computer-readable medium of claim 19 wherein the step of determining said time period associated with said flashback cursor includes determining a time range associated with said flashback cursor based on a point in time associated with said particular flashback query and times associated with indexes used to process said particular flashback query.

21. The computer-readable medium of claim 14 wherein:

said time range includes a high value and a low value;

said low value is established based on the point in time associated with said particular flashback query; and said high value is established based on a lowest time associated with any index used to process said particular flashback query.

22. A computer-readable medium carrying instructions for generating a flashback cursor, the instructions including instructions which, when executed by one or more processors, cause the one or more processors to perform the steps of:

receiving a particular flashback query;

generating said flashback cursor to use to process said particular flashback query;

determining a time range based on a point in time associated with said particular flashback query and times associated with indexes that are to be used to process said particular flashback query; and associating said time range with said flashback cursor.

23. The computer-readable medium of claim 22 wherein:

said time range includes a high value and a low value;

said low value is established based on the point in time associated with said particular flashback query; and said high value is established based on a lowest time associated with any index used to process said particular flashback query.

24. The computer-readable medium of claim 22 further comprising instructions for performing the step of allowing flashback queries received subsequent to creation of said flashback cursor to share said flashback cursor when said subsequent flashback queries satisfy a set of conditions relative to said flashback cursor.

25. The computer-readable medium of claim 24 wherein the set of conditions includes a condition that flashback times associated with said subsequent flashback queries fall within the time range associated with said flashback cursor.

26. The computer-readable medium of claim 25 wherein at least two of said subsequent flashback queries concurrently use said flashback cursor.

* * * * *